United States Patent
Hagh Gooie et al.

(10) Patent No.: US 12,447,340 B2
(45) Date of Patent: Oct. 21, 2025

(54) AUDITORY NEURAL INTERFACE DEVICE

(71) Applicant: CEREGATE GMBH, Munich (DE)

(72) Inventors: Saman Hagh Gooie, Hamburg (DE); Bálint Várkuti, Munich (DE); Ricardo Smits Serena, Munich (DE)

(73) Assignee: Ceregate GmbH, Munich (DE)

( * ) Notice: Subject to any disclaimer, the term of this patent is extended or adjusted under 35 U.S.C. 154(b) by 488 days.

(21) Appl. No.: 17/698,341

(22) Filed: Mar. 18, 2022

(65) Prior Publication Data

US 2023/0191129 A1 Jun. 22, 2023

(30) Foreign Application Priority Data

Dec. 17, 2021 (EP) .................................. 21215578

(51) Int. Cl.
 *A61N 1/05* (2006.01)
 *A61N 1/36* (2006.01)
 (Continued)

(52) U.S. Cl.
 CPC ....... *A61N 1/36038* (2017.08); *A61N 1/0541* (2013.01); *A61N 1/36062* (2017.08);
 (Continued)

(58) Field of Classification Search
 CPC .............. A61N 1/36038; A61N 1/0541; A61N 1/36062; A61N 1/36128; A61N 1/37282;
 (Continued)

(56) References Cited

U.S. PATENT DOCUMENTS 7,251,530 B1 7/2007 Overstreet et al.
8,065,013 B2 11/2011 Bradley et al.
(Continued)

FOREIGN PATENT DOCUMENTS

DE 102019202666 A1 8/2020
DE 102020213417 A1 4/2022
(Continued)

OTHER PUBLICATIONS

European Search Report issued in European Application No. 21215578. 2, mailed on Jun. 10, 2022, 5 pages.
(Continued)

*Primary Examiner* — Carl H Layno
*Assistant Examiner* — Anh-Khoa N Dinh
(74) *Attorney, Agent, or Firm* — Kowert, Hood, Munyon, Rankin & Goetzel, P.C.; Jeffrey C. Hood; Luke Langsjoen (57) ABSTRACT

An auditory neural interface device for sound perception by an individual that may be used as a hearing aid. The auditory neural interface device includes a receiver configured to receive sound signals, a processor operably connected to the receiver and configured to encode a received sound signal as a multi-channel neurostimulation signal, and a neurostimulation device operably connected to the processor and configured to apply the multi-channel neurostimulation signal to a neurostimulation electrode of the individual. The neurostimulation signal is configured to directly stimulate afferent sensory neurons of the central nervous system of the individual and thereby to elicit, for each channel of the neurostimulation signal, one or more non-auditory, preferably somatosensory, perceptions in a cortex area of the individual. Each channel of the neurostimulation signal is associated with a different non-auditory perception.

20 Claims, 7 Drawing Sheets

(51) Int. Cl.
*A61N 1/372* (2006.01)
*H04R 25/00* (2006.01)

(52) U.S. Cl.
CPC ..... *A61N 1/36128* (2013.01); *A61N 1/37282* (2013.01); *H04R 25/558* (2013.01); *H04R 2225/41* (2013.01); *H04R 2225/43* (2013.01)

(58) Field of Classification Search
CPC .............. A61N 1/36185; A61N 1/3606; A61N 1/36057; H04R 25/558; H04R 2225/41; H04R 2225/43; G06N 20/00; G06N 3/08; G06N 3/044; G06N 3/045; G06N 5/02; G06N 7/01; G06N 3/04; G06N 3/105; G06N 5/048; G06N 3/047; G06N 3/084; G06N 5/04; G06N 3/006; G06N 3/02; G06N 3/088; G06N 3/126; G06N 5/046; G06F 3/015; G06F 3/014; A61B 5/686; A61B 2560/0223; A61B 5/407; A61B 5/7264; A61B 2562/0219; A61B 2562/0247; A61B 5/0004; A61B 5/0031; A61B 5/01; A61B 5/0215; A61B 5/024; A61B 5/0533; A61B 5/1112; A61B 5/1117; A61B 5/165
See application file for complete search history.

(56) References Cited

U.S. PATENT DOCUMENTS

| | | | |
|---|---|---|---|
| 9,078,065 | B2 | 7/2015 | Karam et al. |
| 9,675,777 | B2 | 6/2017 | O'Grady et al. |
| 9,679,546 | B2 | 6/2017 | Ebeling et al. |
| 9,720,515 | B2 | 8/2017 | Wagner et al. |
| 9,786,201 | B2 | 10/2017 | Ebeling et al. |
| 9,883,294 | B2 * | 1/2018 | Blessing .............. H04R 25/554 |
| 10,437,335 | B2 | 10/2019 | Daniels |
| 10,869,142 | B2 | 12/2020 | Gran et al. |
| 11,260,235 | B2 | 3/2022 | Várkuti |
| 11,344,725 | B2 | 5/2022 | Várkuti |
| 2005/0267549 | A1 * | 12/2005 | Della Santina ........ A61N 1/372 607/57 |
| 2011/0129093 | A1 | 6/2011 | Karam et al. |
| 2011/0295331 | A1 * | 12/2011 | Wells ................... A61N 5/0601 607/3 |
| 2014/0275737 | A1 * | 9/2014 | Shore ..................... A61F 11/00 600/26 |
| 2015/0332659 | A1 | 11/2015 | Ebeling et al. |
| 2015/0352359 | A1 * | 12/2015 | Fredelake ......... H04M 1/72478 607/57 |
| 2016/0012688 | A1 | 1/2016 | Eagleman et al. |
| 2019/0232047 | A1 * | 8/2019 | Chu ...................... A61H 23/00 |
| 2020/0398046 | A1 | 12/2020 | Várkuti |
| 2021/0064605 | A1 | 3/2021 | Bálint |
| 2022/0054830 | A1 | 2/2022 | Gooie |

FOREIGN PATENT DOCUMENTS

| | | |
|---|---|---|
| EP | 3170479 A1 | 5/2017 |
| EP | 3574951 B1 | 6/2021 |
| WO | 2012069429 A1 | 5/2012 |
| WO | 2020174051 A1 | 9/2020 |
| WO | 2022038112 A1 | 2/2022 |

OTHER PUBLICATIONS

"Benefits and Risks of Cochlear Implants," FDA, 7 pages, Retrieved from the Internet: URL: https://www.fda.gov/medical-devices/cochlear-implants/benefits-and-risks-cochlear-implants, Retrieved on Sep. 26, 2022.

Cucis P.A., et al., "Cochlear Implant: On the Number of Channels," International Information and Engineering Technology Association, Dec. 2018, vol. 79, No. 4, pp. 179-184.

"Deafness and Hearing Loss," World Health Organisation, Apr. 1, 2021, 7 pages, Retrieved from the Internet: URL: https://www.who.int/en/news-room/fact-sheets/detail/deafness-and-hearing loss, Retrieved on Sep. 26, 2022.

Mckay C.M., et al., "Can ECAP Measures Be Used for Totally Objective Programming of Cochlear Implants?," 2013, vol. 14, pp. 879-890.

Wong K., et al., "Auditory Brainstem Implants: Recent Progress and Future Perspectives," Fronteirs in Neuroscience, Jan. 29, 2019, vol. 13, Article 10, 8 pages.

Zeng F-G., et al., "Development and Evaluation of the Nurotron 26-Electrode Cochlear Implant System," Hearing Research, 2015, vol. 322, pp. 188-199.

* cited by examiner

AUDITORY NEURAL INTERFACE DEVICE

PRIORITY CLAIM

This application claims priority to European Patent Application number EP 21215578.2, titled "Auditory Neural Interface Device" and filed on Dec. 17, 2021, which is hereby incorporated by reference in its entirety, as though fully and completely set forth herein.

TECHNICAL FIELD

The present disclosure relates to an auditory neural interface device for supporting or enabling sound perception by an individual.

TECHNICAL BACKGROUND

Sound perception is essential for survival and living a normal life in modern society. In particular, the communication between humans relies on spoken language. Also experiencing the joy of music is typically not possible without being able to perceive sound. Proper communication between humans ensures the ability of individuals to develop and evolve in a social environment. This is particularly important for children at their early stage in life.

Presently, more than over 5% of the human population suffer from a disabling hearing loss. This has a detrimental effect in terms of the communication and participation in groups of individuals. It is estimated that this number will increase to 10% by 2050. There are three different types of hearing loss: conductive hearing loss, sensorineural hearing loss, and mixed hearing loss.

Conductive hearing loss can usually be treated or improved by way of a surgery or infection treatment.

Treatment of sensorineural hearing loss on the other hand typically requires a specific type of hearing aid, for instance a cochlear implant or auditory brainstem implant (ABI). It is known that merely about 1 in 20 patients who could potentially benefit from such an implant, do actually receive it. This is mainly attributed to a limited access to the complex surgical procedures necessary for implantation. Further, implanting these devices in the skull can have adverse effects to the patient, because there is the inherent risk of side effects, such as nerve damage, dizziness and/or balance problems, hearing loss, tinnitus, leaks of the fluid around the brain, meningitis etc. Even further, children who could hear some sounds and/or speech with hearing aids, may not be eligible for cochlear implants although improved hearing capability would drastically improve their personal development. Further risks associated with existing cochlear implant technology, or the related surgical procedures are, for instance, risk of losing residual hearing, inability to understand language, complex explanation procedure in case of device failure, and more.

A further detrimental effect of cochlear implants is that they cannot provide for hearing aid when deafness is caused by an injury or an absence of the auditory nerve fibers themselves, for instance in case of Neurofibromatosis type 2. For this scenario, ABIs are used as an alternative that bypasses the cochlear nerve to electrically stimulate second order neurons in the cochlear nucleus. However, implanting an ABI is an extremely invasive surgery accompanied by a high risk of failure, and even if successful, most patients do not achieve open set speech perception even with extensive training.

The following prior art documents briefly describe the technical background of the present disclosure.

U.S. Pat. No. 7,251,530 B1 relates to errors in pitch allocation within a cochlear implant. Those errors are said to be corrected in order to provide a significant and profound improvement in the quality of sound perceived by the cochlear implant user. In one example, the user is stimulated with a reference signal, e.g., the tone "A" (440 Hz) and then the user is stimulated with a probe signal, separated from the reference signal by an octave, e.g., high "A" (880 Hz). The user adjusts the location where the probe signal is applied, using current steering, until the pitch of the probe signal, as perceived by the user, matches the pitch of the reference signal, as perceived by the user. In this manner, the user maps frequencies to stimulation locations in order to tune his or her implant system to his or her unique cochlea.

Research article "*Can ECAP Measures Be Used for Totally Objective Programming of Cochlear Implants*", 10.1007/s10162-013-0417-9 (DOI), published online on Sep. 19, 2013, relates to an experiment with eight cochlear implant subjects to investigate the feasibility of using electrically evoked compound action potential (ECAP) measures other than ECAP thresholds to predict the way that behavioral thresholds change with rate of stimulation, and hence, whether they can be used without combination with behavioral measures to determine program stimulus levels for cochlear implants.

U.S. Pat. No. 9,786,201 B2 and U.S. Pat. No. 9,679,546 B2 both relate to vibratory motors that are used to generate a haptic language for music or other sound that is integrated into wearable technology. This technology enables the creation of a family of devices that allow people with hearing impairments to experience sounds such as music or other auditory input to the system. For example, a "sound vest" or one or more straps comprising a set of motors transforms musical input to haptic signals so that users can experience their favorite music in a unique way and can also recognize auditory cues in the user's everyday environment and convey this information to the user using haptic signals.

EP 3 574 951 B1 relates to an apparatus and method for use in treating tinnitus, which employs a sound processing unit, a tactile unit, and an interface therebetween. The tactile unit comprises an array of stimulators each of which can be independently actuated to apply a tactile stimulus to a subject, and the tactile unit comprises an input for receiving a plurality of actuation signals from the interface and directing individual actuation signals to individual stimulators.

U.S. Pat. No. 9,078,065 B2 relates to a method and a system for presenting audio signals as vibrotactile stimuli to the body in accordance with a Model Human Cochlea. Audio signals are obtained for presentation. The audio signals are separated into multiple bands of discrete frequency ranges that encompass the complete audio signal. Those signals are output to multiple vibrotactile devices. The vibrotactile devices may be positioned in a respective housing to intensify and constrain a vibrational energy from the vibrotactile devices. Output of the vibrotactile devices stimulate the cutaneous receptors of the skin at the locations where the vibrotactile devices are placed.

Applicant's own DE 10 2019 202 666 A1 relates to a system for providing neural stimulation signals. The system is configured to elicit sensory percepts in the cortex of an individual that may be used for communicating conceptual information to an individual. The system comprises means for selecting at least one neural stimulation signal to be applied to at least one afferent axon directed to at least one sensory neuron in the cortex of the individual. The at least one neural stimulation signal corresponds to the conceptual information to be communicated. The system further comprises means for transmitting the at least one neural stimulation signal to stimulation means of the individual.

US 2016/0012688 A1 relates to providing information to a user through somatosensory feedback. A hearing device is provided to enable hearing-to-touch sensory substitution as a therapeutic approach to deafness. By way of signal processing on received signals, the hearing device may provide better accuracy with the hearing-to-touch sensory substitution. The signal processing includes low bitrate audio compression algorithms, such as linear predictive coding, mathematical transforms, such as Fourier transforms, and/or wavelet algorithms. The processed signals may activate tactile interface devices that provide touch sensation to a user. For example, the tactile interface devices may be vibrating devices attached to a vest, which is worn by the user.

For further reference, the following prior art documents may be in part be relevant for characterizing the technological background of the present invention.

U.S. Pat. No. 8,065,013 B2 relates to a method of transitioning stimulation energy (e.g., electrical stimulation pulses) between a plurality of electrodes that are implanted within a patient.

U.S. Pat. No. 10,437,335 B2 relates to a wearable Haptic Human/Machine Interface (HHMI) which receives electrical activity from muscles and nerves of a user. An electrical signal is determined having characteristics based on the received electrical activity. The electrical signal is generated and applied to an object to cause an action dependent on the received electrical activity. The object can be a biological component of the user, such as a muscle, another user, or a remotely located machine such as a drone.

U.S. Pat. No. 10,869,142 B2 relates to a new binaural hearing aid system, which is provided with a hearing aid in which signals that are received from external devices, such as a spouse microphone, a media player, a hearing loop system, a teleconference system, a radio, a TV, a telephone, a device with an alarm, etc., are filtered with binaural filters in such a way that a user perceives the signals to be emitted by respective sound sources positioned in different spatial positions in the sound environment of the user, whereby improved spatial separation of the different sound sources is facilitated.

SUMMARY OF THE INVENTION

As explained above, several attempts have been made in the prior art to provide for an improved hearing aid. However, the prior art methods, devices and systems have various deficiencies. As discussed above, the methods, devices and systems known from the prior art may, for example, not be suited to establish sound perception in an easy and flexible manner and/or may require difficult to perform and/or expensive neurosurgical procedures (e.g., implantation of Cochlea or ABI electrodes). Further, some prior art solutions partially rely on complex devices such as wearables which are bulky and cumbersome and/or might interfere in an unnatural way with the normal behavior of an individual. It is thus a problem underlying the present invention to overcome such and similar deficiencies of previous technologies.

This and similar problems are at least partially solved by the auditory neural interface device, system and computer program specified in the appended claims. The provided auditory neural interface device, system and computer program allow to restore or support sound perception even for individuals that cannot receive a cochlear implant or ABI and/or provide high-fidelity sound perception that cannot be achieved with prior art technologies.

Specifically, some embodiments provide an auditory neural interface device for supporting or enabling sound perception by an individual, comprising: a receiver module (or receiver) configured to receive sound signals (e.g., analog or digital electrical signals generated by a microphone or obtained from remote sound transducer apparatus), a processing module (or processor) operably connected to the receiver module and configured to encode a received sound signal as a multi-channel neurostimulation signal. The multi-channel neurostimulation signal is configured to directly stimulate afferent sensory neurons of the central nervous system, CNS, (i.e., of the brain and/or the spinal cord) of the individual and thereby to elicit, for each channel of the multi-channel neurostimulation signal, one or more non-auditory, preferably somatosensory, perceptions in a cortex area of the individual, wherein each channel of the neurostimulation signal is associated with a different non-auditory perception. The device further comprises a neurostimulation module (or neurostimulator) operably connected to the processing module and configured to apply the multi-channel neurostimulation signal to a neurostimulation means of the individual (e.g., a multi-channel neurostimulation electrode). Alternatively, the device comprises a transmitter module configured to transmit the multi-channel neurostimulation signal to a remote neurostimulation device which in turn is configured to apply the multi-channel neurostimulation signal to a neurostimulation means of the individual.

Essentially, in this manner, it is possible to implement an improved hearing aid based on using low-invasiveness implants to the central nervous system, CNS, (e.g., Spinal-Cord-Simulation, SCS) as a gateway to communicate sound-analogues to the recipient's brain, to either augment hearing for patients with partial hearing loss or to give a new opportunity to a broader patient population who cannot receive cochlear implants.

Further, in some embodiments, encoding by the processing module may comprise applying a filter operation to the received sound signal to generate a plurality of subcomponent signals of the sound signal and mapping each subcomponent signal to a different channel of the multi-channel neurostimulation signal. For instance, the sound signal can be decomposed with a method that is chosen on the basis of how much information the neural interface can transmit.

Figure 3:
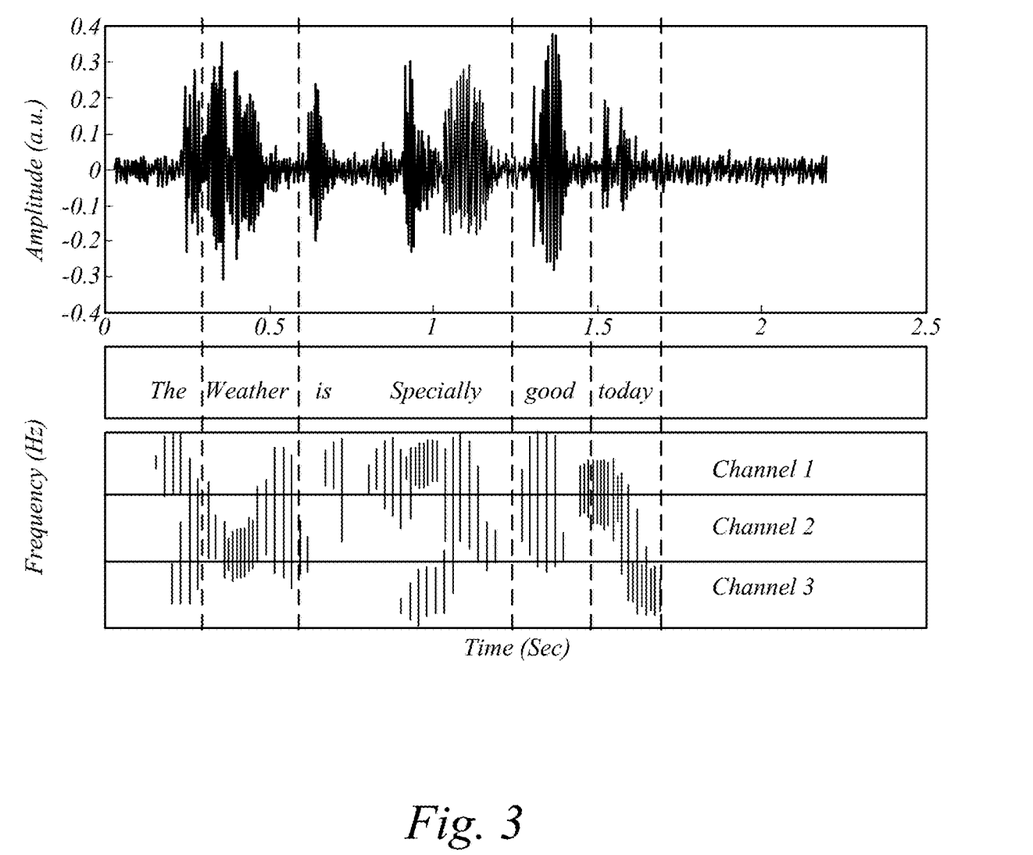
FIG. 3 a diagram illustrating how an auditory neural interface device according to an embodiment of the present disclosure applies a filter operation to received sound signal generating three subcomponent signals that can be mapped to three different perceptual channels.

Further, said filter operation may involve performing spectral analysis, wavelet analysis, principal component analysis, independent component analysis, using a filter bank, and/or a combination thereof. In a simple example, as illustrated in FIG. 3 in section 4. below, a received sound signal (e.g., a sample of speech or a sample of a piece of music, etc.) may be subdivided (e.g., via a bank of N bandpass filters) into N subcomponent signals corresponding to N different frequency bands.

Via encoding sound signals in multiple, non-auditory perceptual channels the neural interface device can enable or support sound perception even for patients that cannot be treated via conventional cochlear implants or ABIs. Moreover, not being limited to the physiologic structure and function of the auditory nerve and upstream auditory processing may substantially improve flexibility, channel count and the fidelity of sound signal representation. In this manner, even complex auditory stimuli such as speech in a cocktail party environment or classical music can be perceived with sufficient fidelity.

In the same manner as an infant's brain is capable of associating syntactic meaning with perceived auditory stimuli through (repetitive) interaction with the physical/auditory environment (e.g., via reinforcement learning), a patient can learn to associate the information content of physical sound signals (e.g., the conceptual information encoded in speech, traffic noise, music, etc.) with the non-auditory perceptions elicited by the multi-channel neurostimulation signal. In order to do so, it is important that the neural representation of the physical sound signal that is generated by the multi-channel neurostimulation signal is complex and variable enough that the relevant information content can be preserved during auditory processing and subsequent neurostimulation.

In some embodiments, the processing module may be configured to determine, preferably via an on-line auto-calibration procedure, a maximal number N of different perceivable perceptual channels that are specific for the individual and select the applied filter operation based on the determination, such that a fidelity of a representation of the received sound signal by the plurality of subcomponent signals is maximized for the determined number of perceptual channels. For example, after the maximal number N of usable perceptual channels is determined, independent component analysis or a similar filter operation can be applied to the received sound signal in order to subdivide it into N subcomponent signals in such a manner that the information content/entropy of the neural representation of the sound signal elicited by applying the subcomponent signals to the afferent neurons is maximized.

Such an on-line autocalibration of the neural interface device/neurostimulation signal may be based on observing the excitation behavior or neural activation function of afferent sensory nerve fibers that can be stimulated by a given neurostimulation means such as a SCS-electrode or DBS electrode connected to corresponding a neurostimulation module or device. This approach is based on the insight that there exist strong correlations between the highly non-linear bioelectric response of an active stimulated afferent sensory nerve fiber (e.g., ECAP) or plurality of such fibers and a corresponding artificial sensory perception/artificial sensation elicited in a sensory cortex area of the individual. This non-linear bioelectric response essentially serves as a fingerprint of the afferent sensory nerve fiber that can be measured and used for on-line recalibration of neurostimulation signal parameters for direct neurostimulation of afferent sensory neurons targeting directly or indirectly (i.e., via multi-synaptic afferent pathways) sensory neurons in a specific target sensory cortex area. In this manner, long-term stability of highly specific, fine-grained and multi-dimensional information transfer to the brain can be ensured.

More specifically, the auditory neural interface device may be configured (e.g., via a suitable firmware routine or software application) to carry out an on-line auto-calibration procedure that may comprise the following steps:

determining a plurality of independently operable stimulation electrodes or contacts of a neurostimulation interface operably connected to or integrated with the neural interface device; choosing a set of test signal parameters preferably associated with a set of N output qualities of a sound processor; generating, based on the chosen set of test signal parameters, a plurality of neurostimulation test signals configured to elicit a bioelectric response in one or more afferent sensory neurons of the individual;

applying the generated plurality of neurostimulation test signals to the afferent sensory neurons via one or more of the determined plurality of stimulation electrodes or contacts of the neurostimulation interface; sensing, via the neurostimulation interface, one or more bioelectric responses of the one or more stimulated afferent sensory nerve fibers; and determining, based on the sensed bioelectric responses, a number N of different sensations that can independently be elicited in one or more cortex areas of the individual via neurostimulation of the one or more afferent sensory nerve fibers.

For instance, determining the N different (artificial) sensations may comprises comparing the sensed bioelectric responses with a set of reference responses stored in a memory module of the neural interface device or obtained via a wired or wireless communication interface of the neural interface device.

Further, determining, for one or more of the N determined sensations and based at least partially on the sensed bioelectric responses, a dynamic range of one or more neurostimulation signals that are configured to elicit the one or more determined sensations; and, optionally, subdividing the determined dynamic range into M, preferably equidistant, intervals.

In this manner, the symbol count (e.g., S0=low intensity, S1=medium intensity, S2=high intensity) of each perceptual channel can be determined and optimized to maximize channel capacity.

The auto-calibration procedure may further comprise receiving, via a communication interface or user interface of the neural interface device, sensory feedback information from the individual associated with one or more of the sensations elicited by the plurality of neurostimulation test signals; and using the sensory feedback information for determining and/or characterizing the N different sensations and/or using the sensory feedback information for determining and/or subdividing the determined dynamic range of the one or more neurostimulation signals that are configured to elicit the one or more determined sensations.

In this manner, the fidelity of perceptual channel characterization can be improved, since the recorded bioelectric responses can be correlated with the (subjective) sensory feedback information provided by the patient/individual. For instance, the feedback information may comprise one or more indications of one or more of the following characteristics of the elicited sensations: a sensory modality, a location, an intensity and a frequency.

Determining the number N of usable perceptual channels (and the number M of symbols/differentiable perceptual levels/qualities per channel) in this manner allows the filters/signal transformations to be applied in a dynamic manner to the received sound signal, so that the fidelity of the neural representation is adapted (e.g., maximized) in real-time and in an on-line fashion in sync with the auto-calibration. For instance, if the relative distance between the stimulation electrode and the targeted afferent sensory neurons changes (e.g., due to a slow drift of a SCS-electrode or due to a movement of the patient), stimulation parameters can be adjusted such that the number of distinct perceptual channels and thereby sound signal representation fidelity stays as large as possible.

In some embodiments, the processing module may be further configured to apply the filter operation according to multiple selectable filter modes wherein the generation of the subcomponent signals and/or the mapping of the subcomponent signals to the multiple channels of the neurostimulation signal may be based on the selected filter mode.

For instance, the filter mode may be user selectable (e.g., via a user interface) or automatically determined by the processing module.

For instance, the processing module may be further configured to determine, preferably based on an analysis of the received sound signal, an auditory environment and/or a likely type of sound signal source associated with the received sound signal; and encode the received sound signal based on the determined auditory environment and/or type of sound signal source.

This allows the auditory neural interface device to maximize, for a given number of perceptual channels and a likely sound signal source or auditory environment the information content the neural representation of the received sound signal contains.

For instance, certain frequency bands, phoneme subcomponent signals, musical instrument subcomponent signals or more abstract subcomponents signals may, for a whole class or subclass of received sound signals (e.g., speech, classical music), typically contain the majority of the information content of the received sound signal whereas other frequency bands/subcomponent signals mainly contain noise. Thus, by determining the auditory environment and/or the likely type of sound signal source, the processing module can select a filter operation best suited for an expected class sub-class of sound signals. For instance, the processing module may select a set of Gabor filters forming a Gabor filter bank best suited for extracting the spectro-temporal information that is typical for speech signals whereas a band pass filter bank with adjustable gains and bandwidths may be better suited for perceiving an orchestra playing classical music.

Moreover, also the set of perceptual channels may be adjusted based on the determined auditory environment and/or a likely type of sound signal source. For instance, a set of distinct somato-sensory sensations (e.g., a subset of the dermatomes or peripheral nerve fields of the back side of the torso; see FIG. 1 below) might be best suited for perceiving classical music and experiencing the joy in doing so whereas a set of phosphenes, e.g., perceived in the periphery of the retina may be best suited for speech perception, e.g., via mapping a set of Gabor-filtered subcomponent signals to a set of phosphenes that can be distinguished by the individual as different vowels, consonants, phonemes etc.

In general, the multiple filter modes may comprise one or more of the following:
  a speech perception mode, a music perception mode, a closed space mode, an open space mode, a foreign language mode, a multi-source environment mode and a traffic mode. Additionally or alternatively the processing module may be configured to select the filter mode based on the determined auditory environment and/or likely type of sound signal source.

Further, for example to improve the fidelity of the neural sound signal representation, each filter mode may be associated with a plurality of filters being applied to the received sound signal to generate the plurality of subcomponent signals, wherein the filters may comprise bandpass filters, wavelet filters and/or Gabor filters or the like.

Alternatively or additionally, the filters may be configured to filter out distinct characteristics of the received sound signal that are typical for an auditory environment and/or a likely type of sound signal source associated with the selected filter mode.

For example, different sets of filters/filter functions may be designed for filtering out vowels, consonants, phonemes, musical instruments, cars, animals, etc. and stored in a memory device of the auditory neural interface device. When the processing module determines, for example, that the likely sound source is music, it might access the memory device and retrieve a set of filters designed for music perception. As discussed above, this pre-configured set may then be further adapted based on the number N of available perceptual channels.

For instance, in some embodiments the number N of channels of the neurostimulation signal may be at least 2 (for representing simple sound characteristics), preferably at least 5 and more preferably at least 20 (for almost natural speech perception).

Additionally, the number of different perceivable perceptual qualities per perceptual channel (e.g., the number of different intensities that can be perceived per channel) may larger than 2 (e.g., loud vs. quiet), preferably larger than 3 (e.g., loud, medium, quiet) and more preferably larger than 10 (e.g., spanning 30 dB of sound pressure level in steps of 3 dB).

As mentioned in a slightly different context above, the processing module may be configured to execute an auto-calibration procedure, preferably interleaved with normal operation, to determine, for a given neurostimulation means or device of the individual, the number of differentiable perceptual channel and/or the number differentiable levels per channel.

To assist the individual's brain in perceiving sound using the auditory neural interface device of the present disclosure, e.g., assist with extracting the information content of speech, at least one of the multiple channels of the multi-channel neurostimulation signal may be an auxiliary channel that encodes at least one of the following characteristics of the received sound signal, a sound power or amplitude, a sound pitch, a sound timing, a direction of the sound signal source and a motional state of the sound signal source.

For instance, the processing module may be configured to determine the direction, distance and/or the velocity vector (i.e., direction and magnitude) of a (moving) sound signal source and encode this information in one or more of perceptual channels established by the multi-channel neurostimulation signal. For example, if two or more spatially separated sound sensors provide sound signals to the auditory neural interface device, arrival time difference, a phase difference and/or a sound signal amplitude difference may be used to determine the spatial direction of a sound signal source. If the type of sound signal source is known, also the total distance may be determined from an amplitude comparison with a reference sound signal. Finally, by determining a Doppler shift associated with sound signals received from a moving sound signal source also the magnitude and direction (i.e. approaching or receding) of the velocity vector can be determined and subsequently communicated to the individual.

For instance, in some embodiments, the sound signal may be received from at least two spatially separated sound sensors and the processor may be configured to determine a direction of the sound signal source based on information in the sound signal associated with the at least two spatially separated sound sensors, preferably based on a phase difference, a timing difference and/or an sound signal amplitude difference associated with the spatial separation of the at least two sound sensors. Alternatively or additionally, the channel that encodes the sound signal direction may be configured to elicit somatosensory perceptions in adjacent areas of a body part, wherein each area corresponds to a different direction.

According to some embodiments, such an auxiliary channel may also encode context information associated with the received sound signal such as information about the sound signal source, a sound signal start or stop indication, one or more sign language symbols associated with the received sound signal, an indication of the emotional state of the sound signal source; and indication of the language used by the sound signal source.

For instance, if the disclosed auditory neural interface is operated in conjunction with DBS-equipment, the auxiliary channel may even use a different type of perception than the channels used for sound perception. For instance, in a dual-interface configuration a (multi-channel) SCS-electrode may be used by the auditory neural interface device to elicit a plurality of sound perceptions representing the received sound signal and a DBS-electrode may be used to elicit artificial sensations/perceptions of a different type/modality, such as vision or smell to implement the auxiliary channel. For example, different taste sensations may be used to encode the emotional state of a speaker (sour=angry, sweet=kind, bitter=joyfull, etc.) thereby providing essential context that supports speech perception and extraction of syntactic meaning from the sound signal representations perceived by the individual.

Further, the neurostimulation signal may be configured such that adjacent channels of the neurostimulation signal elicit somatosensory perceptions in adjacent areas of a body part of the individual or in adjacent body parts, preferably in a tonotopic manner. In this manner, patients that were used to normal cochlear sound processing, that also is based on a tonotopic organization of the sensory cells in the cochlear, will more easily adapt to the auditory interface device.

Figure 1:
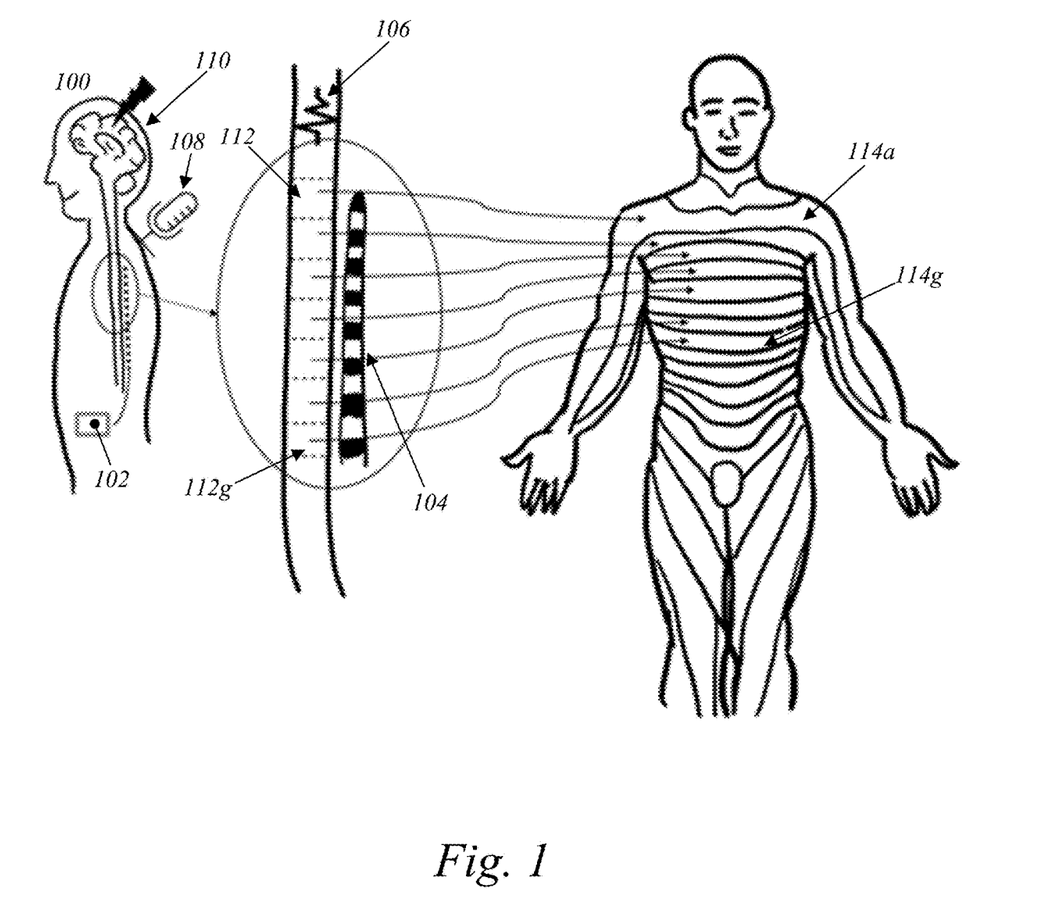
FIG. 1 a diagram illustrating an individual being equipped with an auditory neural interface device according to an embodiment of the present disclosure.

Further, the neurostimulation signal may be configured such that the areas of the body part are arranged in an essentially 2D array and, wherein one direction of the array encodes sound source direction, and the other direction is used for mapping the adjacent channels. More generally, as illustrated in FIG. 1 below different sound representation channels may be mapped to different dermatomes and/or sub-areas of a dermatome, e.g., via using a look-up table.

Some embodiments relate to an auditory neural interface system for sound perception by an individual, comprising the auditory neural interface device as discussed above and one or more sound sensors providing input signals to the receiver module of the auditory neural interface device and optionally, a neurostimulation device for stimulating afferent sensory neurons in the brain and/or the spinal cord of the individual.

Further embodiments relate to a computer program, comprising instructions for carrying out the following steps, when being executed by a neural interface device of an individual: receiving a sound signal, encoding the received sound signal as a multi-channel neurostimulation signal, the neurostimulation signal being configured, to directly stimulate afferent sensory neurons of the central nervous system, CNS, of the individual and thereby to elicit, for each channel of the neurostimulation signal, one or more non-auditory, preferably somatosensory, sensations in a cortex area of the individual, wherein each channel of the neurostimulation signal is associated with a distinct type of non-auditory perception; and applying the neurostimulation signal to a neurostimulation means of the individual or transmitting the neurostimulation signal to a remote neurostimulation device.

Such a computer program may comprise further instructions for operating the neural interface device in order to implement the functionalities as described above for the various embodiments of the neural interface device.

More specifically, the various modules of the devices and systems disclosed herein can for instance be implemented in hardware, software or a combination thereof. For instance, the various modules of the devices and systems disclosed herein may be implemented via application specific hardware components such as application specific integrated circuits, ASICs, and/or field programmable gate arrays, FPGAs, and/or similar components and/or application specific software modules being executed on multi-purpose data and signal processing equipment such as CPUs, DSPs and/or systems on a chip (SOCs) or similar components or any combination thereof.

For instance, the various modules of the auditory neural interface device discussed above may be implemented on a multi-purpose data and signal processing device configured for executing application specific software modules and for communicating with various sensor devices and/or neurostimulation devices or systems via conventional wireless communication interfaces such as a NFC, a WIFI and/or a Bluetooth interface.

Alternatively, the various modules of the auditory neural interface device discussed above may also be part of an integrated neurostimulation apparatus, further comprising specialized electronic circuitry (e.g. neurostimulation signal generators, amplifiers etc.) for generating and applying the multi-channel neurostimulation signal to a neurostimulation interface of the individual (e.g. a multi-contact spinal cord stimulation electrode, a deep brain stimulation (DBS) electrode, etc.).

The neurostimulation signals generated by the auditory neural interface device described above may for instance also be transmitted to a neuronal stimulation device comprising a signal amplifier driving a multi-contact DBS electrode, spinal cord electrode, etc. that may already be implanted into a patient's nervous system for a purpose different than providing a hearing aid. Alternatively, dedicated DBS-like electrodes or spinal cord stimulation electrodes may be implanted for the purpose of applying the neurostimulation signals generated by the auditory neural interface device via established and approved surgical procedures that were developed for implantation of conventional DBS electrodes or spinal cord stimulation electrodes etc. Further, as mentioned above the auditory neural interface device may also be integrated together with a neuronal stimulation device into a single device.

SHORT DESCRIPTION OF THE FIGURES

Various aspects of the present disclosure are described in more detail in the following by reference to the accompanying figures. These figures show.

DETAILED DESCRIPTION OF SOME EXEMPLARY EMBODIMENTS

In the following, some exemplary embodiments of the present disclosure are described in more detail, with reference to an auditory neural interface device that can be interfaced with neuronal stimulation electrodes such as spinal cord stimulation electrodes, DBS electrodes, etc., via an intermediate neuronal stimulation device. However, the present disclosure can also be used with any other neuronal stimulation interface that is capable of stimulating afferent sensory axons of the CNS targeting one or more sensory cortex areas of an individual.

While specific feature combinations are described in the following with respect to the exemplary embodiments of the present disclosure, it is to be understood that not all features of the discussed embodiments have to be present for realizing the technical advantages provided by the devices, systems, methods and computer programs provided by the present disclosure. The disclosed embodiments may be modified by combining certain features of one embodiment with one or more features of another embodiment if technically feasible and functionally compatible. Specifically, the skilled person will understand that features, steps, components and/or functional elements of one embodiment can be combined with technically compatible features, steps, components and/or functional elements of any other embodiment of the present invention which is defined by the appended claims.

Moreover, the various modules of the devices and systems disclosed herein can for instance be implemented in hardware, software, or a combination thereof. For instance, the various modules of the devices and systems disclosed herein may be implemented via application specific hardware components such as application specific integrated circuits, ASICs, and/or field programmable gate arrays, FPGAs, and/or similar components and/or application specific software modules being executed on multi-purpose data and signal processing equipment such as CPUs, DSPs and/or systems on a chip (SOCs) or similar components or any combination thereof.

For instance, the various modules of the auditory neural interface device discussed herein above may be implemented on a multi-purpose data and signal processing device configured for executing application specific software modules and for communicating with various sensor devices and/or neurostimulation devices or systems via conventional wireless communication interfaces such as a Near Field Communication (NFC), a WIFI and/or a Bluetooth interface.

Alternatively, the various modules of the auditory neural interface device provided by the present disclosure may also be part of an integrated neurostimulation apparatus, further comprising specialized electronic circuitry (e.g. neurostimulation signal generators, amplifiers etc.) for generating and applying the determined neurostimulation signals to a neurostimulation interface of the individual (e.g. a multi-contact electrode, a spinal cord stimulation electrode, a DBS electrode etc.).

FIG. 1 illustrates a person/individual 100 that is equipped with an auditory neural interface device as described in section 3 above and illustrated in an exemplary manner in FIG. 2 below. In the illustrated embodiment, the auditory neural interface device is implemented via direct neurostimulation of afferent sensory nerve fibers in the spinal cord via one or more multi-contact electrodes 104 driven by an implantable pulse generator (IPG) 102 that may be operatively/communicatively connected to or integrated with an auditory neural interface device as disclosed herein.

For establishing multiple perceptual communication channel to the brain of the individual 100 the auditory neural interface device may be calibrated such that neurostimulation signals generated by the auditory neural interface device and applied via the IPG 102 and the multi-contact electrode 104 elicit one or more action potentials 106 in one or more afferent sensory nerve fibers of the spinal cord 106 targeting (e.g. via multi-synaptic afferent sensory pathways) one or more sensory cortex areas 110 of the individual 100 where the one or more action potentials 106 generate (directly or indirectly) artificial sensory perceptions that can be used to represent a received sound signal (se FIG. 3 below) to be perceived by the brain of the individual 100. As discussed in detail in US 2020/0269049, fully incorporated herein by reference, artificial sensory perceptions that are elicited in a sensory cortex area (e.g. a sensory cortex area processing touch sensations on the left or right hand) can also be associated with any kind of abstract information that is intelligible (i.e. consciously or subconsciously) by the individual 100.

In operation, the auditory neural interface device receives sound signals recorded via one or more sound sensors/microphones 108 that may be worn by the individual 100, be integrated with the auditory neural interface device and/or be provided by a general purpose data and signal processing device such as a smart phone. For instance, some or all functionalities of the auditory neural interface devices discussed in detail in section 3 above, may be implemented via application specific software modules executed by such a general-purpose data and signal processing device which in turn may be interfaced (e.g., wirelessly) with the IPG 102 or a similar neurostimulation device operating in conjunction to implement a sensory substitution-based hearing aid.

For the embodiment illustrated in FIG. 1 the perceptual channels correspond to different dermatomes 114*a*-114*g* innervated by spinal nerve fibers branching of the spinal cord at location 112*a* to 112*g*. In this general example different contacts of the stimulation electrode may be used to stimulate regions of the spinal cord typically relaying sensory information from a given dermatome (e.g., a dermatome 114*a* located on the front torso of the person).

In other embodiments, complex, multi-contact neural stimulation signals may also be used to selectively stimulate single peripheral nerve fields within a given dermatome or combinations of dermatomes and/or peripheral nerve fields.

Figure 2:
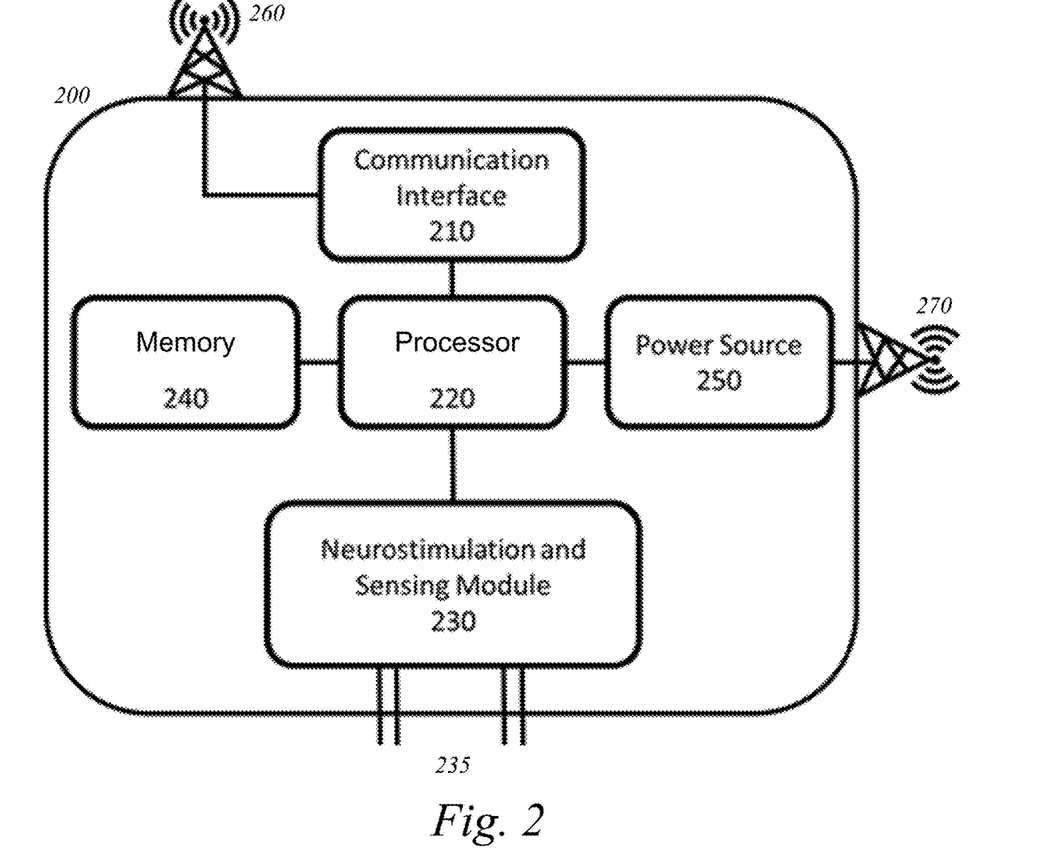
FIG. 2 a functional block circuit diagram illustrating an auditory neural interface device to an embodiment of the present disclosure.

FIG. 2 shows an exemplary auditory neural interface device 200 according to an embodiment of the present disclosure. In this embodiment, the CBI device comprises an integrated neurostimulation and sensing module 230 (e.g. comprising a neuronal signal generator and an output amplifier as well as a sensing amplifier and an analog to digital converted and similar circuitry) that is connected to a plurality of output signal leads 235 and a plurality of separate or identical sensing signal leads 235 that may be interfaced with a neurostimulation interface of the individual (e.g. a multi-contact spinal cord stimulation electrode such as the electrode 104 shown in FIG. 1). The exemplary auditory neural interface device may further comprise a communication antenna 260 operably connected to a communication interface module 210, configured for wireless communication (e.g., via NFC, Bluetooth, or a similar wireless communication technology).

The communication interface module 210 may be configured, for example, to receive one or more sound signals from one or more sound sensors (not shown; e.g., a set of microphones worn by the individual) and/or control information from a control device such as a remote control or a smart phone. The communication interface module 210 is operably connected to a data/signal processor 220 configured to generate one or more neurostimulation signals and/or signal parameters (e.g., waveform, pulse shape, amplitude, frequency, burst count, burst duration etc.) for generating the one or more neurostimulation signals. For instance, the processor 220 may access a memory 250, which may be a non-transitory computer-readable memory medium (e.g., a data storage module), configured to store a plurality of sound signal filters for the various filter modes as described in section 3. above and/or relations, specific for the individual, associating a plurality of neurostimulation signals (or parameters used for generating a plurality of neurostimulation signals) with a plurality of corresponding pieces of auxiliary information to be communicated to the individual, e.g., for establishing a perceptual channel used to indicate the sound source direction, the motional state of the sound signal source and/or context information such as the emotional state of a speaker.

The memory 240 may be any of a variety of types of non-transitory, computer-readable memory media. The data storage module may additionally store program instructions that are executable by the processor to perform the method steps described herein.

The generated neurostimulation signals and/or the signal parameters are input into the integrated neurostimulation and sensing module 230 that may be configured to process (e.g., modulate, switch, amplify, covert, rectify, multiplex, phase shift, etc.) the one or more (multi-channel) neurostimulation signals generated by the processor 220 or to generate the one or more neurostimulation signals based on the signal parameters provided by the processor 220.

The generated and processed neurostimulation signals are then output by the neurostimulation and sensing module 230 and can be applied to one or more electric contacts of a neurostimulation electrode (e.g., a DBS electrode or spinal cord stimulation electrode as shown in FIG. 1) via output leads 235. The auditory neural interface device of FIG. 2 may also comprise a rechargeable power source 250 that, for instance may be wirelessly charged via a wireless charging interface 270.

As discussed above, the processor 220 may be further configured, e.g. in conjunction with the memory 240 and the neurostimulation and sensing module 230, to execute an on-line autocalibration method as discussed in section 3 above. Further, the auditory neural interface device may also comprise a transmitter (e.g., the communication interface 210) as an alternative to the neurostimulation and sensing module 230 to communicate with a remote neurostimulation device in a wired or wireless manner. Alternatively, the transmitter and the neurostimulation device may be collocated as a single module within the auditory neural interface device, wherein the transmitter receives the neurostimulation signal from the processor to provide to the neurostimulation device.

Figure 4:
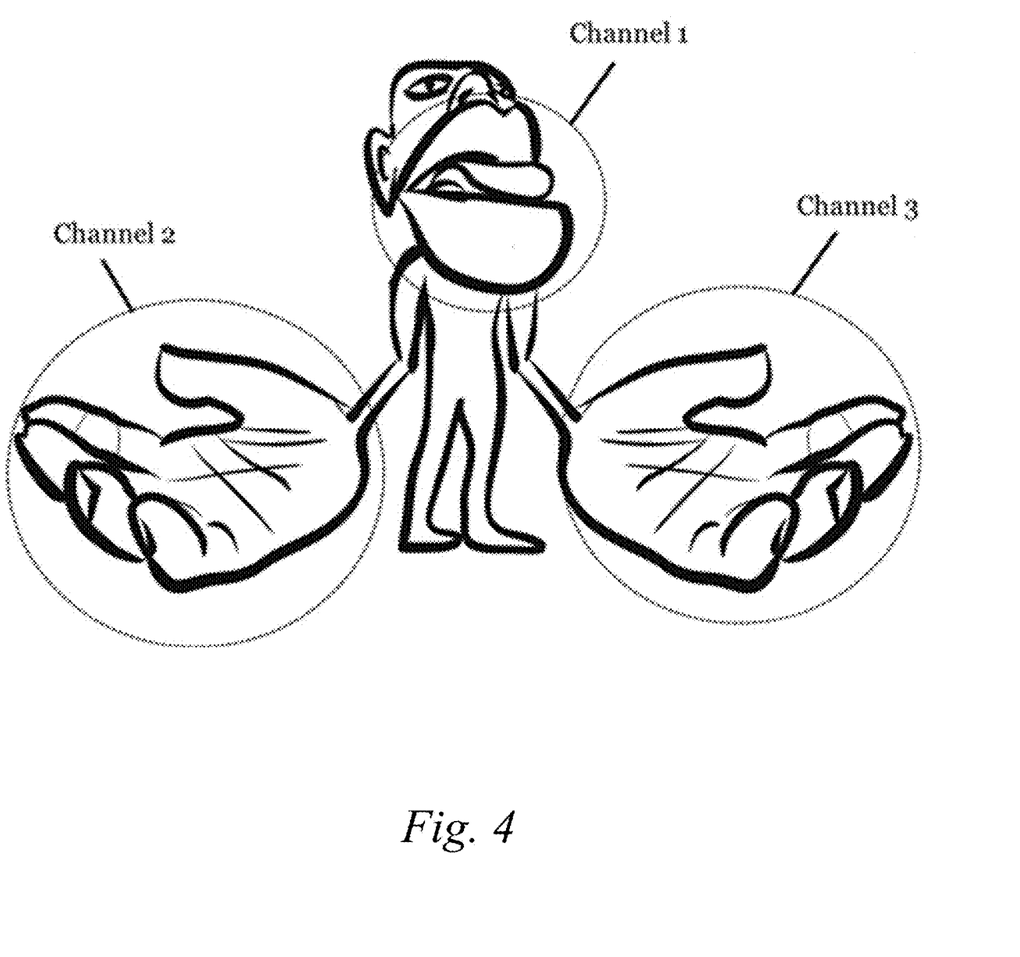
FIG. 4 a homunculus diagram illustrating how the three perceptual channels of FIG. 3 are implemented via three different peripheral perceptive nerve fields.

FIGS. 3 and 4 illustrate a general example how some embodiments of the present invention can be used to establish a three-channel, non-auditory hearing aid for a patient. Specifically, the processing module filters a received sound signal (see waveform in top trace of FIG. 3) via a three-channel filter bank (see spectrogram in lower trace of FIG. 3).

The output signal of each bandpass filter of the filter bank (i.e., a subcomponent signal as discussed in detail in section 3 above) is then separately sampled and used to generate a three-channel neurostimulation signal. As shown in the homunculus diagram of FIG. 4 each of the subcomponent signals is configured to elicit an artificial sensation perceived by the individual in the lips (channel 1; high frequency components of the received sound signal), in the right hand (channel 2, medium frequency components of the received sound signal) and the left hand (channel 3, low frequency components of the received sound signal).

As discussed in detail in section 3 above, instead of a filter bank, other filter operations such as wavelet or Gabor filters may also be used to subdivide a received sound signal into subcomponent signals that are then mapped to different perceptual channels.

In some embodiments, the disclosed auditory neural interface device may be calibrated and N perceptual channels are identified as discussed in section 3 above. Each different channel could then be mapped to a different frequency band. The number N (and the differentiated levels within each channel) will define the maximum resolution or bandwidth of the perceptual/transmission matrix, which relate to a specific characteristic of the implant type and implant location with respect to the neural tissue defined per individual patient. The decomposition algorithm/filter operation of sound signals can be customized, so that e.g., an ICA is conducted which solves for a target number of components equals N. This decomposition matrix may be fixed for the patient and subsequently a completely customized translation of the sound signal occurs that is optimized for the respective patient. In some embodiments, here, pre-calculated ICA decomposition matrices may be applied which are based on e.g. language-specific audio file training sets.

Figure 5:
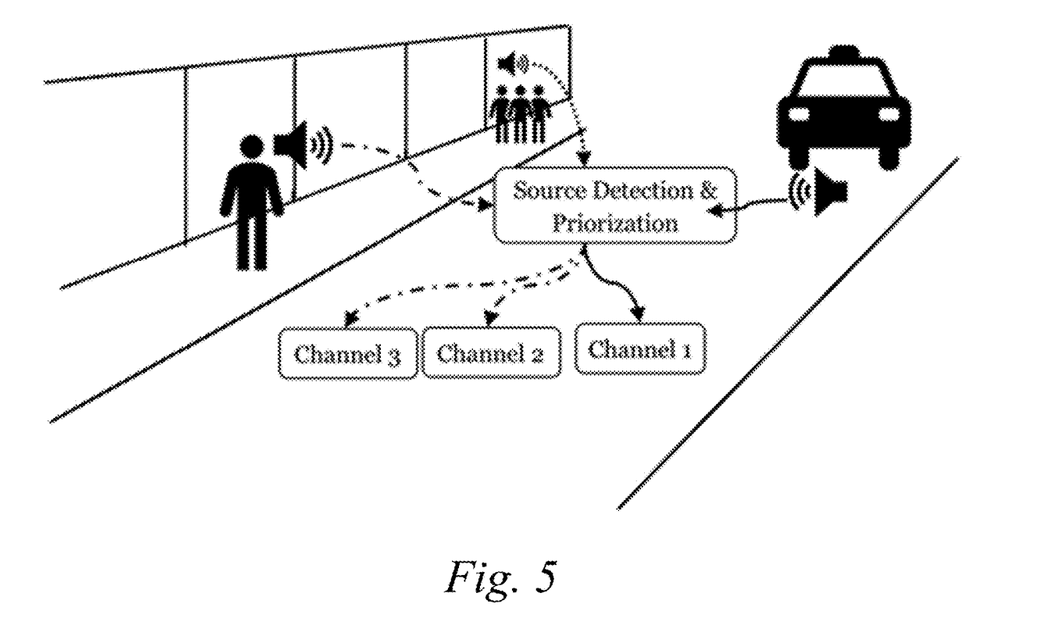
FIG. 5 a diagram illustrating how an auditory neural interface device according to an embodiment of the present disclosure operates in a multi-source outdoor auditory environment.

FIG. 5 illustrates how some embodiments of the disclosed auditory neural interface device 200 can be equipped with source detection/discrimination modules (soft- and/or hardware based) that can enable the auditory neural interface device 200 to determine which part of a complex auditory environment should be perceived by the individual (not shown) with high fidelity and/or priority (e.g., the sound of an approaching car), which sounds with low fidelity/priority (e.g., a person 520 directly talking to the individual) and which sounds are to be filtered out completely (e.g., background noise generated by a remote group of people 530 talking).

As discussed in section 3 above, the filter modes and/or filter function stored in the memory 240 of the auditory neural interface devices 200, can, for example, automatically be selected by the processing module, after a determination that the individual is located in an outdoor environment with likelihood of motorized traffic.

A traffic filter mode may for example use a specialized spatio-temporal filter operation to filter out sounds typically generated by dangerous objects (e.g., cars) with high fidelity and select one of the perceptual channels to transmit this subcomponent signal with high priority and/or signal strength.

Figure 6:
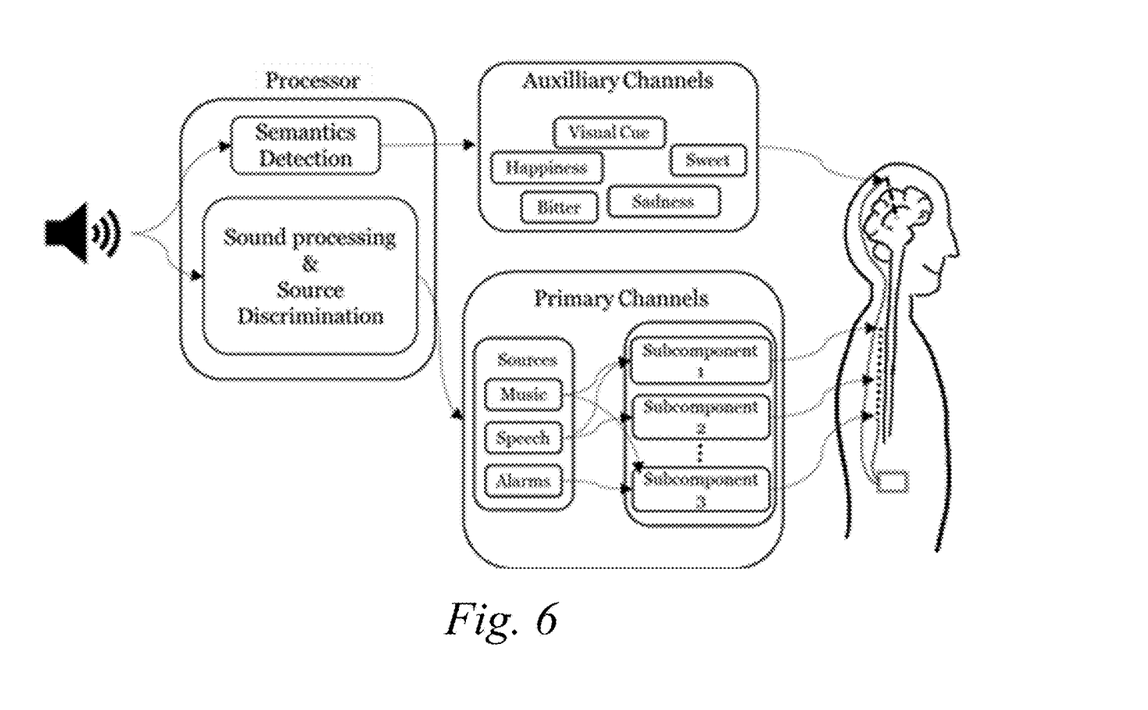
FIG. 6 a diagram illustrating the use of auxiliary sematic channels to improve sound perception facilitated by an auditory neural interface device according to an embodiment of the present disclosure.

FIG. 6 illustrates an embodiment of the disclosed auditory neural interface devices that is configured to transmit auxiliary information such as a sound signal duration or context information such as the emotional state of a speaker via a separate DBS electrode 610, while at the same time an SCS-electrode 104 (as illustrated in detail in FIG. 1 above) is operated to transmit the multi-channel neurostimulation signal used for sound signal representation.

As discussed above, the processing module of the auditory neural interface device is configured to map, based on a selected filter mode and/or operation different types of sound signal sources (music, speech, alarms) to different perceptual channel addressable via the SCS-electrode. In addition to the source discrimination and prioritization module discussed for FIG. 5 above, the processor may also comprise or execute a semantics and/or context detection module that allows the auditory neural interface device to determine relevant context information, such as the language used by a sound source.

For instance, an auxiliary taste channel may be used to signal to the individual whether a sound signal source uses a foreign language (sweet) or the native language of the individual. In another example the emotional state may be encoded as artificial taste sensations, e.g. (aggressive=bitter; empathic=sweet). For instance, modern speech processing software (e.g., trained multi-layered neural networks) may be used automatically extract meaning and/or context of received speech signals.

Figure 7:
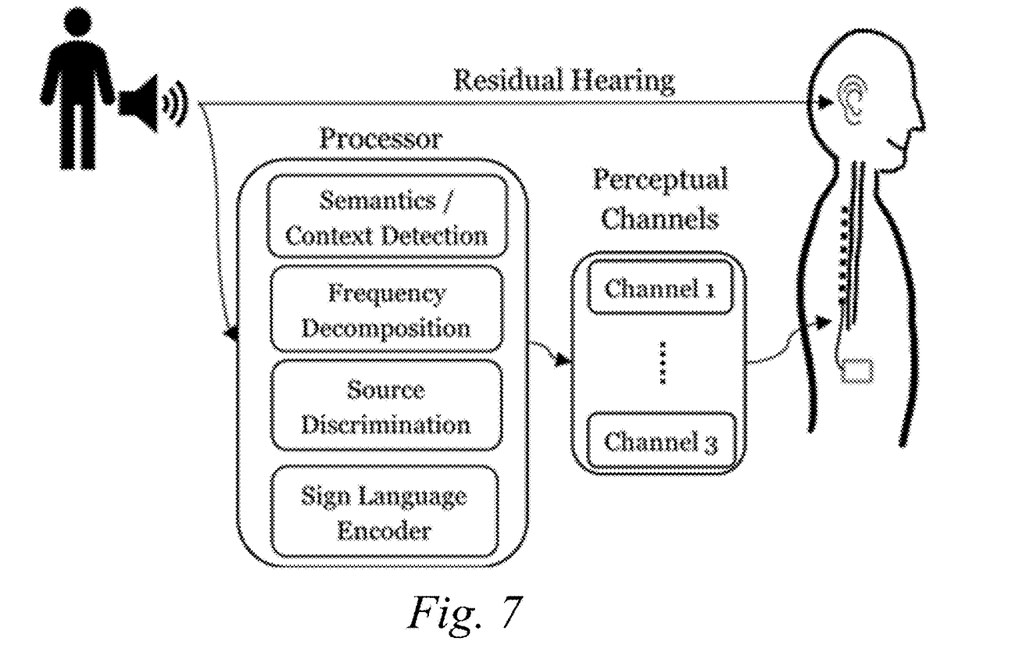
FIG. 7 a diagram illustrating how an auditory neural interface device according to an embodiment of the present disclosure can be used to support sound perception for individuals with residual hearing capabilities.

FIG. 7 illustrates that some embodiments of the present disclosure can also be used to supplement or support persons having residual hearing providing even further benefits over conventional Cochlear implants. FIG. 7 also illustrates, that in some embodiments, the auditory neural interface device may also comprise a hard-and/or software implemented sign language encoder module that can support sound perception by the individual by operating in a sign-language assistance mode. For example, all or part of the typical sign-language hand poses can be translated into a combination of individually detectable perceptual channels and be used to support sound perception by the individual.

Figure 8:
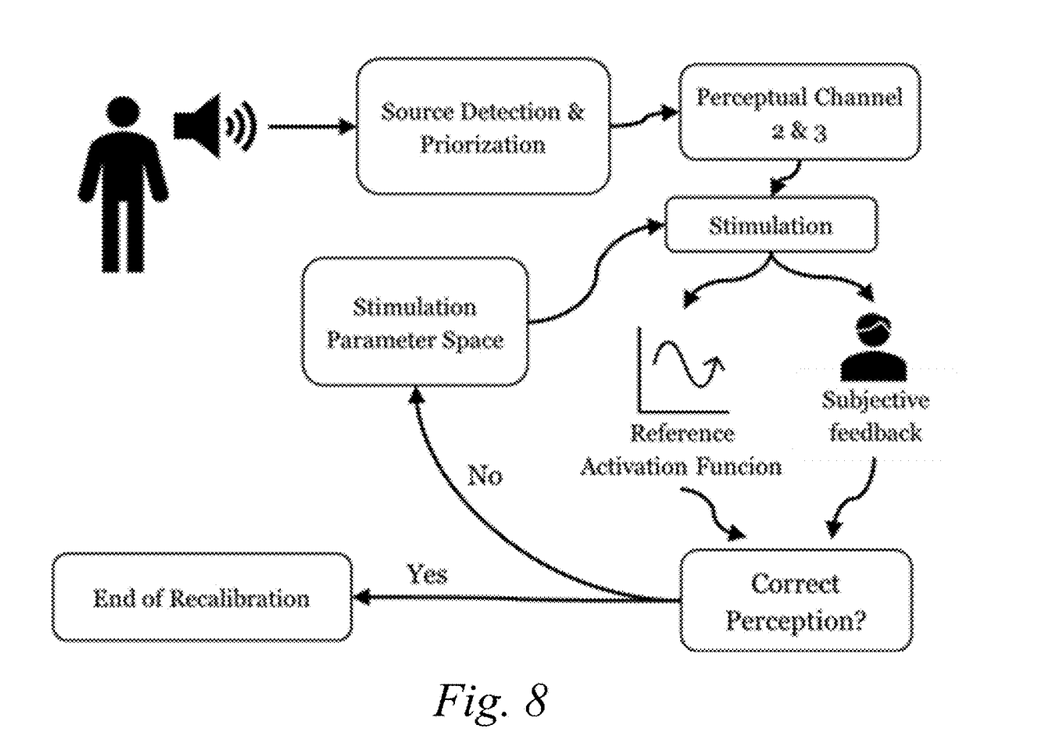
FIG. 8 a diagram illustrating how an auditory neural interface device according to an embodiment of the present disclosure can be recalibrated in an automatic and on-line manner during operation as hearing aid.

FIG. 8 illustrates the auto-recalibration procedure that is discussed in detail in section 3 above. For instance, in some embodiments, while the disclosed auditory neural interface device receives sound signals and processes (e.g., filters, maps, etc.) them as discussed above the neuronal sensing module 230 (see FIG. 2 above) constantly records the bioelectric responses (e.g., ECAP or somatosensory EESP, or extracellularly measured action potentials or similar bioelectric response) of the stimulated nerves/nerve fibers/neurons and derives an activation function that can be compared to a reference activation function 810 (as disclosed in U.S. patent application Ser. No. 17/224,953, incorporated herein in its entirety). Alternatively or additionally, sensory feedback 820 from the patient can be used to determine whether the fidelity of the sound signal representation is still optimal or may be improved by readjusting the signal parameters and/or the filter operation used to generate the multi-channel neurostimulation signal. In this manner, the performance of the non-auditory hearing aid implemented by the auditory neural interface device can be maintained as good as possible even in normally behaving (e.g., moving) patients.

Figure 9:
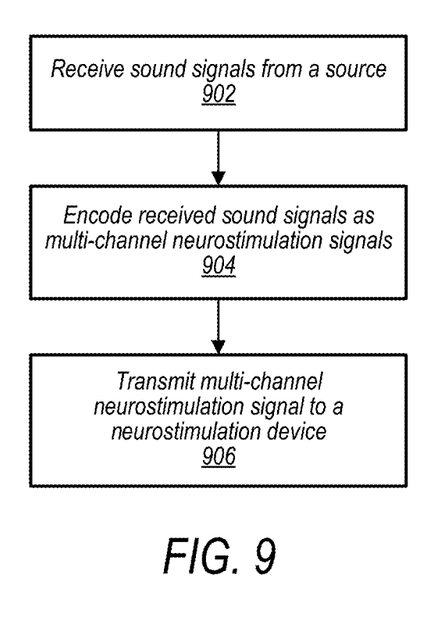
FIG. 9 a flowchart diagram illustrating a method for an auditory neural interface device to provide sound perception to an individual, according to some embodiments.

FIG. 9 is a flow chart diagram illustrating a method for an auditory neural interface device and/Or system to provide sound perception to an individual, according to some embodiments. Aspects of the method of FIG. 9 may be implemented by a wireless device, such as the auditory neural interface device 200, in communication with one or more sounds sensors and/or implanted neurostimulation devices, as illustrated in and described with respect to the Figures, or more generally in conjunction with any of the computer systems or devices shown in the Figures, among other circuitry, systems, devices, elements, or components shown in the Figures, among other devices, as desired. For example, one or more processors (or processing elements) of the auditory neural interface device (e.g., processor(s) 220, baseband processor(s), processor(s) associated with communication circuitry, etc., among various possibilities) may cause the device to perform some or all of the illustrated method elements. The device may be configured with a non-transitory computer-readable memory medium, such has memory 240, which stores program instructions which are executable by the processor to perform the described method steps. In various embodiments, some of the elements of the methods shown may be performed concurrently, in a different order than shown, may be substituted for by other method elements, or may be omitted. Additional method elements may also be performed as desired. As shown, the method may operate as follows.

At 902, sound signals are received from a source by a receiver of the auditory neural interface device. The sound signals may be received from one or more sounds sensors (e.g., microphones), which may be configured to transmit the sound signals to the receiver in a wired or wireless manner. Alternatively, the auditory neural interface device may be configured with one or more sound sensors to detect sound in the environment.

In some embodiments, the sound signal is received from at least two spatially separated sound sensors. In these embodiments, a direction of a sound signal source of the sound signal may be determined based on information in the sound signal associated with the at least two spatially separated sound sensors. For example, the direction of the sound signal source may be determined based on a phase difference, a timing difference, and/or a sound signal amplitude difference associated with a spatial separation of the at least two sound sensors. A first channel of the plurality of channels may encode the sound signal direction by eliciting somatosensory perceptions in adjacent areas of a body part, wherein each area corresponds to a different direction.

At 904, a received sound signal is encoded as a multi-channel neurostimulation signal including a plurality of channels. The neurostimulation signal may be configured to directly stimulate afferent sensory neurons of a central nervous system (CNS) of the individual through one or more neurostimulation electrodes and thereby elicit, for each channel of the neurostimulation signal, one or more non-auditory perceptions in a cortex area of the individual. Each channel of the neurostimulation signal may be associated with a different non-auditory perception. Advantageously, sound perception may be provided to the individual without directly stimulating the auditory system of the individual. For example, somatosensory perception may be provided (e.g., the individual may be stimulated to perceive different touch sensations on the left and right hands), and these perceptions may be coded to cause the perception of sound.

Encoding the received sound signal as the multi-channel neurostimulation signal may include applying a filter operation to the received sound signal to generate a plurality of subcomponent signals of the sound signal and mapping each subcomponent signal of the plurality of subcomponent signals to a different respective channel of the multi-channel neurostimulation signal. The processor may determine, via an auto-calibration procedure, a maximal number of different perceivable perceptual channels that are specific for the individual. The processor may select the applied filter operation based on the determination, such that a fidelity of a representation of the received sound signal by the plurality of subcomponent signals is maximized for the determined number of different perceivable perceptual channels. The filter operation may involve using a filter bank to perform one or more of spectral analysis, wavelet analysis, principal component analysis, and independent component analysis. The processor may be further configured to apply the filter operation according to a plurality of selectable filter modes, and the generation of the plurality of subcomponent signals and the mapping of each subcomponent signal to the different channels of the multi-channel neurostimulation signal may be performed based on a selected filter mode of the plurality of selectable filter modes. The plurality of selectable filter modes may include one or more of a speech perception mode, a music perception mode, a closed space mode, an open space mode, a foreign language mode, a multi-source environment mode, and a traffic mode.

The processor may be further configured to determine, based on an analysis of the received sound signal, one or both of an auditory environment and a likely type of sound signal source associated with the received sound signal. The processor may select the filter mode of the selectable filter modes based on one or both of the determined auditory environment and the likely type of sound signal source.

Each filter mode of the plurality of selectable filter modes may be associated with a plurality of filters to be applied to the received sound signal to generate the plurality of subcomponent signals. The filters may be bandpass filters, wavelet filters and/or Gabor filters. The filters may filter out distinct characteristics of the received sound signal that are typical for one or both of an auditory environment and a likely type of sound signal source associated with the selected filter mode.

In some embodiments, the neurostimulation signal is configured such that adjacent channels of the neurostimulation signal elicit somatosensory perceptions in adjacent areas of a body part of the individual or in adjacent body parts. In some embodiments, the somatosensory perceptions are elicited in a tonotopic manner.

At least one of the multiple channels may be an auxiliary channel that uses a different type of perception than the channels used for sound perception. The auxiliary channel may encode one or more of an amplitude of the received sound signal, a pitch of the received sound signal, a timing of the received sound signal, a direction of a sound signal source of the received sound signal, a motional state of the sound signal source of the received sound signal, context information associated with the received sound signal, wherein the context information comprises information about the sound signal source, a sound signal start or stop indication, one or more sign language symbols associated with the received sound signal, an indication of an emotional state of the sound signal source, and an indication of a language used by the sound signal source.

In some embodiments, based on an analysis of the received sound signal, one or both of an auditory environment and a likely type of sound signal source associated with the received sound signal may be determined. The received sound signal may be encoded based on one or both of the auditory environment and the type of sound signal source.

At 906, the multi-channel neurostimulation signal is transmitted to a neurostimulation device, which applies the multi-channel neurostimulation signal to a neurostimulation electrode of the individual. The neurostimulation device may be configured as part of the auditory neural interface device, or it may be a remote device separate from the auditory neural interface device and configured to receive the multi-channel neurostimulation signal from a transmitter of the auditory neural interface device in a wired or wireless manner.

In some embodiments, a calibration procedure may be dynamically executed to determine, for the neurostimulation device, one or both of a number of differentiable channels and a number differentiable perceivable perceptual qualities per channel. The calibration procedure may be interleaved with transmitting the multi-channel neurostimulation signal to the neurostimulation device, such that the sound perception may be adapted to accommodate movement of the individual, or other events that may modify the sound perception.

What is claimed is:

1. An auditory neural interface device for sound perception by an individual, comprising:
   a receiver comprising one or more microphones configured to receive sound signals;
   a processor operably connected to the receiver and configured to encode a received sound signal as a multi-channel neurostimulation signal comprising a plurality of channels,
   wherein, in encoding the received sound signal as the multi-channel neurostimulation signal, the processor is configured to:
      apply a filter operation to the received sound signal to generate a plurality of subcomponent signals of the received sound signal;
      map each subcomponent signal of the plurality of subcomponent signals to a different respective channel of the multi-channel neurostimulation signal;
      determine, via an auto-calibration procedure, a maximal number of different perceivable perceptual channels that are specific for the individual; and
      select the applied filter operation based on the determination, such that a fidelity of a representation of the received sound signal by the plurality of subcomponent signals is maximized for the determined maximal number of different perceivable perceptual channels,
   wherein the multi-channel neurostimulation signal is configured to:
      directly stimulate afferent sensory neurons of a central nervous system (CNS) of the individual and thereby elicit, for each channel of the multi-channel neurostimulation signal, one or more non-auditory perceptions in a cortex area of the individual, wherein each channel of the multi-channel neurostimulation signal is associated with a different non-auditory perception; and
   a wired or wireless transmitter configured to transmit the multi-channel neurostimulation signal to a neurostimulation device configured to apply the multi-channel neurostimulation signal to a neurostimulation electrode of the individual.

2. The auditory neural interface device of claim 1, wherein the non-auditory perceptions comprise somatosensory perceptions.

3. The auditory neural interface device of claim 1, wherein at least one of the plurality of channels is an auxiliary channel that uses a different type of perception than the channels used for sound perception, wherein the auxiliary channel encodes one or more of:
   an amplitude of the received sound signal;
   a pitch of the received sound signal;
   a timing of the received sound signal;
   a direction of a sound signal source of the received sound signal;
   a motional state of the sound signal source of the received sound signal;
   context information associated with the received sound signal, wherein the context information comprises information about the sound signal source;
   a sound signal start or stop indication;
   one or more sign language symbols associated with the received sound signal;
   an indication of an emotional state of the sound signal source; and
   an indication of a language used by the sound signal source.

4. The auditory neural interface device of claim 1, wherein the filter operation involves using a filter bank to perform one or more of spectral analysis, wavelet analysis, principal component analysis, and independent component analysis.

5. The auditory neural interface device of claim 1,
   wherein the processor is further configured to apply the filter operation according to a plurality of selectable filter modes, and
   wherein the generation of the plurality of subcomponent signals and the mapping of each subcomponent signal to the different channels of the multi-channel neurostimulation signal is performed based on a selected filter mode of the plurality of selectable filter modes.

6. The auditory neural interface device of claim 5,
   wherein the plurality of selectable filter modes comprise one or more sets of filters or filter functions that are designed for filtering out vowels, consonants, phonemes, musical instruments, cars or animals.

7. The auditory neural interface device of claim 6,
   wherein the processor is further configured to:
   determine, based on an analysis of the received sound signal, one or both of an auditory environment and a likely type of sound signal source associated with the received sound signal; and
   select the filter mode of the selectable filter modes based on one or both of the determined auditory environment and the likely type of sound signal source.

8. The auditory neural interface device of claim 5,
   wherein each filter mode of the plurality of selectable filter modes is associated with a plurality of filters to be applied to the received sound signal to generate the plurality of subcomponent signals; and
   wherein the filters comprise one or more of bandpass filters, wavelet filters and Gabor filters, and
   wherein the filters are configured to filter out distinct characteristics of the received sound signal that are typical for one or both of an auditory environment and a likely type of sound signal source associated with the selected filter mode.

9. The auditory neural interface device of claim 1,
   wherein the processor is further configured to:
   determine, based on an analysis of the received sound signal, one or both of an auditory environment and a likely type of sound signal source associated with the received sound signal; and
   encode the received sound signal based on one or both of the auditory environment and the type of sound signal source.

10. The auditory neural interface device of claim 1,
    wherein a number of differentiable channels of the multi-channel neurostimulation signal is at least 2, 5 or 20;
    wherein a number of different perceivable perceptual qualities per channel is larger than 2, 3 or 10; and
    wherein the processor is configured to dynamically execute a calibration procedure interleaved with transmitting the multi-channel neurostimulation signal to the neurostimulation device to determine, for the neurostimulation device, one or both of the number of differentiable channels and the number differentiable perceivable perceptual qualities per channel.

11. The auditory neural interface device of claim 1, wherein the multi-channel neurostimulation signal is configured such that adjacent channels of the multi-channel neurostimulation signal elicit somatosensory perceptions in adjacent areas of a body part of the individual or in adjacent body parts.

12. The auditory neural interface device of claim 11, wherein the somatosensory perceptions are elicited in a tonotopic manner.

13. The auditory neural interface device of claim 1,
    wherein the sound signal is received from at least two spatially separated sound sensors,
    wherein the processor is further configured to determine a direction of a sound signal source of the sound signal based on information in the sound signal associated with the at least two spatially separated sound sensors, wherein the direction of the sound signal source is determined based on one or more of:
    a phase difference associated with a spatial separation of the at least two sound sensors;
    a timing difference associated with the spatial separation of the at least two sound sensors; and
    a sound signal amplitude difference associated with the spatial separation of the at least two sound sensors, and
    wherein a first channel of the plurality of channels encodes the sound signal direction by eliciting somatosensory perceptions in adjacent areas of a body part by stimulation via the multi-channel neurostimulation signal, wherein each area corresponds to a different direction.

14. The auditory neural interface device of claim 1, wherein the auditory neural interface device further comprises:
    one or more sound sensors providing input signals to the receiver of the auditory neural interface device; and
    a neurostimulation device for stimulating afferent sensory neurons in the brain or the spinal cord of the individual.

15. The auditory neural interface device of claim 1,
    wherein the auditory neural interface device comprises the neurostimulation device, or
    wherein the neurostimulation device comprises a remote device separate from the auditory neural interface device.

16. A non-transitory computer-readable memory medium comprising program instructions which, when executed by a processor, cause a neural interface device of an individual to:
receive a sound signal;
encode the received sound signal as a multi-channel neurostimulation signal comprising a plurality of channels, wherein, in encoding the received sound signal as the multi-channel neurostimulation signal, the program instructions are executable by the processor to cause the neural interface device to:
apply a filter operation to the received sound signal to generate a plurality of subcomponent signals of the received sound signal;
map each subcomponent signal of the plurality of subcomponent signals to a different respective channel of the multi-channel neurostimulation signal;
determine, via an auto-calibration procedure, a maximal number of different perceivable perceptual channels that are specific for the individual; and
select the applied filter operation based on the determination, such that a fidelity of a representation of the received sound signal by the plurality of subcomponent signals is maximized for the determined maximal number of different perceivable perceptual channels,
wherein the multi-channel neurostimulation signal is configured to directly stimulate afferent sensory neurons of a central nervous system (CNS) of the individual and thereby elicit, for each of the plurality of channels of the multi-channel neurostimulation signal, one or more non-auditory perceptions in a cortex area of the individual, wherein each of the plurality of channels of the multi-channel neurostimulation signal is associated with a distinct type of non-auditory perception; and
transmit the multi-channel neurostimulation signal to a neurostimulation device to apply the multi-channel neurostimulation signal to a neurostimulation electrode of the individual.

17. The non-transitory computer-readable memory medium of claim 16, wherein the non-auditory perceptions comprise somatosensory perceptions.

18. A method for providing sound perception to an individual, the method comprising:
receiving a sound signal, wherein the sound signal is received from at least two spatially separated sound sensors;
determining a direction of a sound signal source of the sound signal based on information in the sound signal associated with the at least two spatially separated sound sensors, wherein the direction of the sound signal source is determined based on one or more of:
a phase difference associated with a spatial separation of the at least two sound sensors;
a timing difference associated with the spatial separation of the at least two sound sensors; and
a sound signal amplitude difference associated with the spatial separation of the at least two sound sensors,
encoding the received sound signal as a multi-channel neurostimulation signal comprising a plurality of channels, wherein a first channel of the plurality of channels encodes the sound signal direction by eliciting somatosensory perceptions in adjacent areas of a body part by stimulation via the multi-channel neurostimulation signal, wherein each area corresponds to a different direction, wherein the multi-channel neurostimulation signal is configured to:
directly stimulate afferent sensory neurons of a central nervous system (CNS) of the individual and thereby elicit, for each channel of the multi-channel neurostimulation signal, one or more non-auditory perceptions in a cortex area of the individual, wherein each channel of the multi-channel neurostimulation signal is associated with a different non-auditory perception; and
transmitting the multi-channel neurostimulation signal to a neurostimulation device configured to apply the multi-channel neurostimulation signal to a neurostimulation electrode of the individual.

19. The method of claim 18, wherein the non-auditory perceptions comprise somatosensory perceptions.

20. The method of claim 18, wherein encoding the received sound signal as the multi-channel neurostimulation signal comprises:
applying a filter operation to the received sound signal to generate a plurality of subcomponent signals of the sound signal; and
mapping each subcomponent signal of the plurality of subcomponent signals to a different respective channel of the multi-channel neurostimulation signal.

\* \* \* \* \*